Oct. 31, 1967   B. C. BENDICSEN   3,350,705
INDICATING APPARATUS

Filed Oct. 7, 1964   5 Sheets-Sheet 1

INVENTOR:
BJARNE C. BENDICSEN
BY:-
Marzall, Johnston, Cook & Root
ATT'YS

Oct. 31, 1967

B. C. BENDICSEN 3,350,705

INDICATING APPARATUS

Filed Oct. 7, 1964

INVENTOR:-
BJARNE C. BENDICSEN
BY:-
Marzall, Johnston, Cook & Root
ATT'YS

Oct. 31, 1967     B. C. BENDICSEN     3,350,705
INDICATING APPARATUS
Filed Oct. 7, 1964     5 Sheets-Sheet 4

INVENTOR:-
BJARNE C. BENDICSEN
BY:-
Marzall, Johnston, Cook & Root
ATT'YS

United States Patent Office 3,350,705
Patented Oct. 31, 1967

3,350,705
INDICATING APPARATUS
Bjarne C. Bendicsen, Glen Ellyn, Ill., assignor to U.S. Industries, Inc., New York, N.Y., a corporation of Delaware
Filed Oct. 7, 1964, Ser. No. 402,360
5 Claims. (Cl. 340—324)

The present invention relates in general to indicating apparatus and has more particular reference to an improved readout system adapted to furnish a visual indication of the momentary relative angular position of a rotary mechanism throughout its operating cycle, the invention pertaining more particularly to means operable to show, visually, in terms of relative angularity with respect to a starting or datum position, the progress of a switching system of the sort shown in my co-pending application for U.S. Letters Patent on Cyclic Control Circuitry, Ser. No. 266,406, filed Mar. 19, 1963 which issued as U.S. Patent No. 3,278,767, on Oct. 11, 1966.

As shown in my aforesaid co-pending application, a rotary switching device and associated circuitry may be provided for automation control purposes, wherein the switch is driven with a controlled apparatus, such as a press, so that one complete rotation of the switch corresponds with a complete operational cycle of the controlled apparatus, the switch embodying circularly disposed contact elements subdividing its circle of rotation into a multiplicity of component segments, the arrangement shown serving to divide the circle into one hundred and eighty parts, each subtending an angle of two degrees, although, obviously, a refinement of the apparatus could be provided to subdivide the circle into an even greater number of parts, if desired. An important function of the rotary switch disclosed in my aforesaid co-pending application is to permit any desired number of operable devices to be started in operation at any desired instant, during a rotary cycle of the switch, by appropriate selection of the circuit controlled by the switch contacts that are activated at such desired instant, the disclosed structure permitting the starting in operation of any one or more control devices, at any selected one of the one hundred and eighty circumferentially spaced circuit control stations defined by the circle dividing contacts of the switch, and representing successive time instants during the operating cycle of the controlled mechanism.

The apparatus disclosed in my aforesaid co-pending application has proved to be useful for starting operation of auxiliary apparatus at precise instants during the operating cycle of a principal apparatus or machine; and it is often desirable to ascertain precisely when, during the operating cycle of the principal apparatus, a particular auxiliary device actually starts in operation, in order to permit adjustment or variation of the moment of start of the auxiliary device, so that the same may be started earlier or later during the operating cycle of the principal apparatus, if desired. To this end, the present invention contemplates the provision of visual readout means capable of showing, in terms of angularity measured from a selected zero or datum position, the momentary position of the rotary arm of the automation switch and hence the momentary position of the controlled apparatus, as the arm travels through any selected one or more of the control stations defined by the circle dividing contacts of the switch, during its rotary cycle of operation.

Another important object is to provide for displaying visually, at a conveniently located readout station, three digit numerals corresponding with the angularity from a selected datum position of the rotary member of the automation switch.

Briefly stated, the present invention may comprise one or more three digit numeral display devices capable of visually showing numerals representing angularities up to that of a complete circle, including electrical circuitry for controlling the display of the desired numerals, in combination with circuits for controlling the operation of said numeral display equipment in accordance with the momentary positions occupied by the moving arm of the rotary automation switch of my aforesaid co-pending application, during a complete operational cycle thereof.

A further important object of the invention is to provide, in conjunction with the position indicating visual readout device, one or more manually operable selector switches adjustable to connect or condition auxiliary control apparatus for actuation at the particular instant in the operating cycle of the monitored apparatus that is selected by the manual adjustment of the associated selector switch mechanism, such selector switch mechanism being physically located in close association with the visual readout device in a conveniently accessible location, as on the control panel of the monitored apparatus. For example, where the apparatus is a cyclically operable press, provided with mechanism for braking the press to standstill position, it is usually necessary to start the braking mechanism in operation sometime before the instant at which press standstill condition is attained. Accordingly, in stopping a particular press, at the conclusion of its operating cycle, it may be necessary to start the braking operation when the press has reached, say, the three hundred and forty degree position in its cycle of operation in order to stop the press precisely at the end of its operating cycle represented by the three hundred and sixty degree mark. Under such circumstances, the operator of the press may adjust the press stopping circuit selector switch to its three hundred and forty degree position, in order to stop the press at the desired three hundred and sixty degree cycle position. If, as a result of wear or other circumstances which may arise during the operating life of the press, the braking mechanism should fail to stop the press at the desired position, so that it actually stops in a position, say, eight degrees beyond the desired stopping position, the visual readout indicator will show the stop position actually attained; and if such position should be eight degrees beyond that desired, the operator need merely set back by eight degrees the press stopping circuit selector switch; that is, to say, if the press should over-run a desired stop position by eight degrees, when the selector switch is set at its three hundred and forty degree position, it should be set back to the three hundred thirty-two degree position to rectify the eight degree over-run.

Presses are also frequently provided with holding circuits for maintaining press operation only if the operator manually holds a pair of spaced, normally open, push button switches in closed position, during press closing movement, thus insuring that the operator cannot endanger his hands by putting them in the press as it is about to close. Since the press may become completely closed during, say, the first one hundred and thirty degrees of its operating cycle, more or less, means may be provided, if desired, to render the holding circuit inactive after the press has become closed, to thereby free the hands of the operator for other work after the dangerous closing portion of the cycle has been completed. Depending upon the particular press setup that may be in operation for any particular job of work to be done, it may be desirable to shorten or to lengthen the interval during which the holding circuit is active. Accordingly, a selector switch may be provided for adjustment to deter mine the precise interval of the operating cycle of the monitored apparatus, during which the holding circuit is effective, and to determine the instant when the holding circuit is rendered ineffective. Such a holding circuit selector switch may be mounted adjacent the visual readout device so that the operator of the press may view the readout device to determine the momentary position of the monitored apparatus, in order to facilitate the adjustment of the holding circuit selector switch mechanism. In like fashion, additional selector switches for timing the start of other auxiliary apparatus may be provided in the vicinity of the visual readout device, in order to facilitate adjustment of such additional selector switches.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

To illustrate the invention, the drawings show a rotary electrical switch 11 of the sort shown in U.S. Patent No. 3,278,767, of October 11, 1966, said switch being adapted for use in monitoring any cyclically operable device, mechanism or apparatus, in order to control the performance of such auxiliary or supplemental work or control functions as may be desired in conjunction with the operation of the cyclically operable device, such auxiliary control functions currently being designated by and included within the term "automation."

In attaining the automation of any operation or procedure, it is usually desirable, if not imperative, to monitor the principal operation in some convenient manner and to initiate the several auxiliary work and control functions, required for the performance of the automated procedure, at precisely timed moments during the cycle of operation of the monitored mechanism or apparatus. The electrical switch 11, accordingly, is adapted for operation in timed relation with the monitored apparatus or procedure, and is used to initiate one or more automated work or control functions at any selected moment during the cycle of operation of the monitored qeuipment with which it is used.

Figure 2:
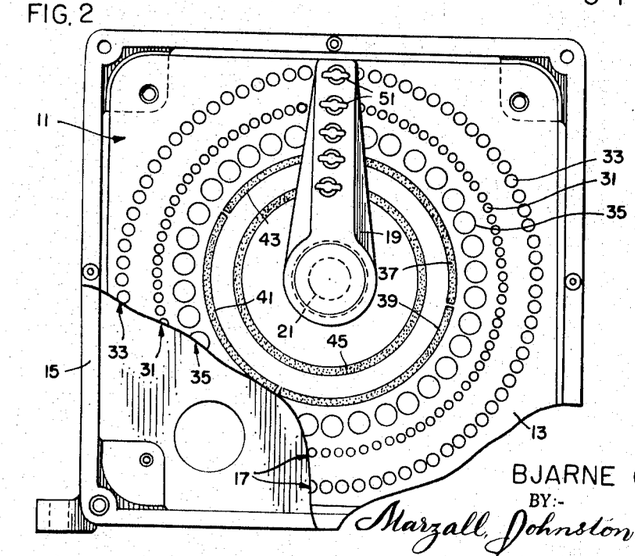
FIG. 2 is a face view of a rotary monitoring switch with which the indicator and adjustable switches shown in FIG. 1 are operatively associated.

To these ends, the switch 11 may comprise a rotary, circle dividing switch embodying a support panel 13 mounted in a suitable frame or base and carrying a plurality of contact elements or buttons 17, spaced apart circumferentially in the mechanism, and a rotary arm 19 adapted to be driven in timed relation with the operating cycle of any cyclically operable apparatus with which the switch may be associated. The arm may be secured on a shaft 21 for turning movement therewith, the shaft being journaled in suitable bearings, mounted in the frame. The shaft may be driven by connection with the apparatus to be monitored or by motive means operated in synchronism or timed relation with the apparatus to be monitored. The arm 19 is provided with preferably carbon brushes adapted to make electrical contact with the contact elements of the switch, in succession, during each complete revolution of the arm. The several buttons 17 thus may form a corresponding number of signal feedback stations disposed in desired position on the panel 13, around the circumference of the switch, and adapted to be made effective for feedback purposes to actuate relay circuitry when the station defining button is contacted by the arm 19 during its rotation.

In the illustrated embodiment, one hundred eighty equally spaced button defined feedback stations are shown, each station being separated from the next by an angle of two degrees at the axis of rotation of the arm 19. It will be apparent, however, that the invention is not necessarily limited either to equal spacement between stations, nor to a station spacement of two degrees; indeed, the invention contemplates station spacement of any desired angularity, or random spacement if required by circumstances.

Figure 1:
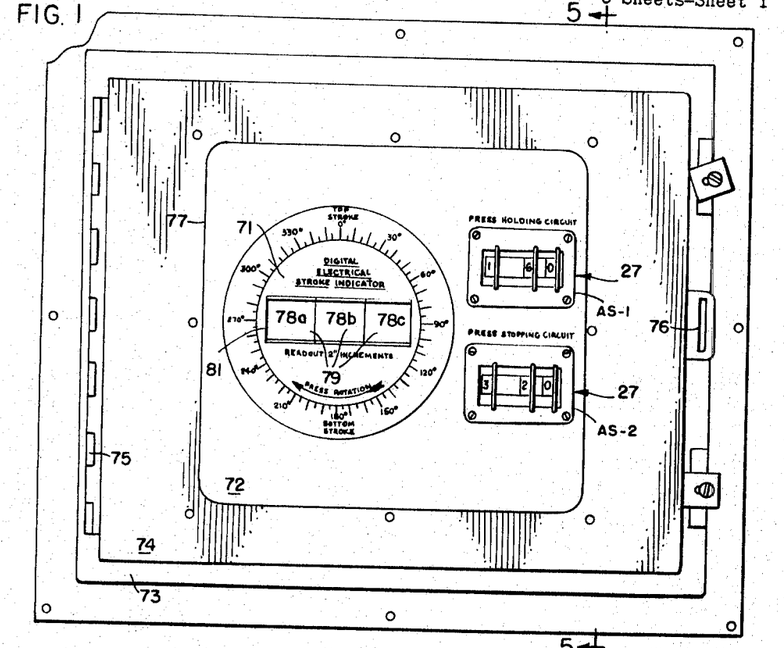
FIG. 1 is a face view of a panel carrying an angular position indicator or readout apparatus and associated manually adjustable selector switches embodying the present invention.

The contact elements of the monitoring switch 11 may be interconnected in an electrical system embodying one or more command stations 27, each comprising contact selecting assemblies, of which two are shown in FIG. 1 and identified respectively as assemblies AS–1 and AS–2. These contact selecting assemblies may be disposed in any desired location adjacent to or remote from the switch mechanism 11 and electrically connected therewith, as by means of conductors 29, which may conveniently comprise a cable extending between the monitor switch 11 and the remotely located command station or stations. As shown, the cable may comprise twenty-seven separate conductors, identified in the drawings by the twenty-six upper case alphabet characters and the ampersand symbol "&." A set of connection terminals 29' may be provided on the panel 13 of the monitor switch to facilitate the electrical connection of the cable conductors 29 with the contact buttons and segments of the switch, said terminals 29' being individually identified in the drawings by the twenty-six lower case alphabet characters and the plus symbol "+." A separate cable, of course, may be used for each contact selecting assembly 27, and the corresponding conductors of the several cables may be connected in common to the appropriate terminal of the set 29'.

Figure 9:
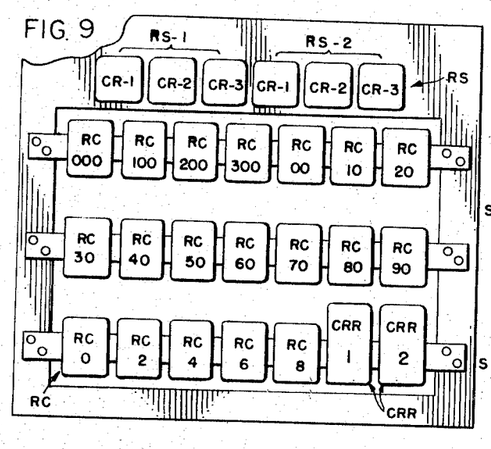
FIG. 9 is a rear view of the panel structure shown in FIG. 5.

Each of the command station selector assemblies 27 may have an associated off and on switch 27' to condition the associated assembly for operation. Each selector assembly, also, is adapted for manual adjustment in order to select or isolate any desired one of the contact elements 17 of the switch 11, and to constitute the same as a feedback station to deliver a signal impulse for the actuation of a set of electrical relay switches RS associated with the selector assembly and which may be employed to perform any desired work or control function in response to the activation of the selected contact element as a feedback station, when the switch arm 19 electrically connects with it, there being two sets of relay switches RS respectively associated with the contact selecting assemblies AS–1 and AS–2 shown in FIG. 1 and identified respectively as switch sets RS-1 and RS-2 in FIG. 9, each set comprising, in the illustrated embodiment, three relay switches CR-1, CR-2 and CR-3.

Figure 3:
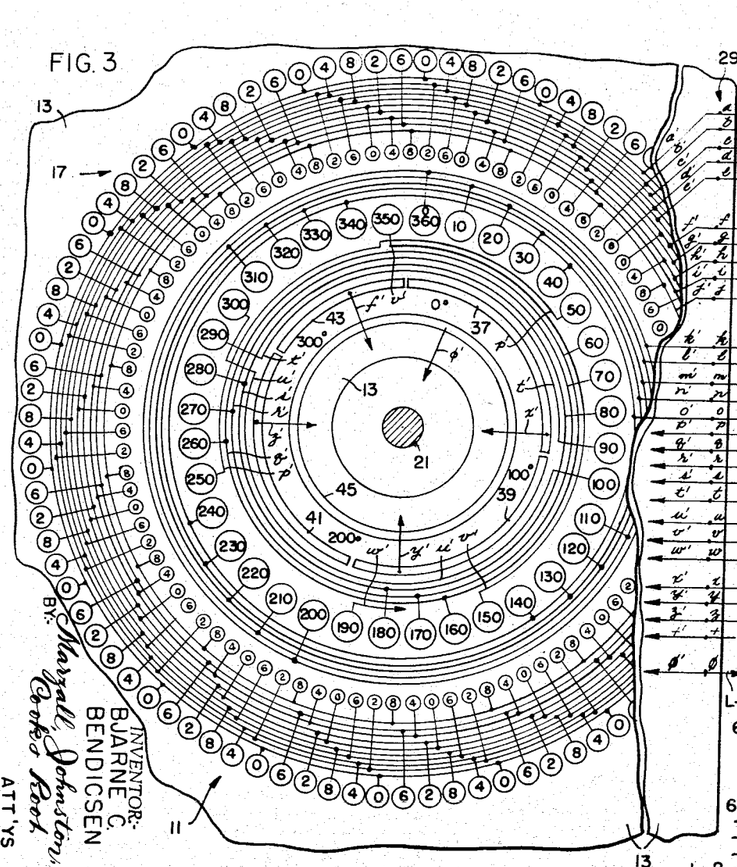
FIG. 3 is a wiring diagram showing the electrical circuitry of the rotary switch of FIG. 2.

In order to hold the size of the rotary switch 11 within reasonable limits while obtaining small angular spacement between adjacent circularly disposed contact buttons 17 of reasonable size, the same, as shown more particularly in FIGS. 2 and 3 of the drawings, may be arranged in two or more concentric rows on the panel 13, with the leading edges of the buttons of the several rows, that is to say, the edges which are first engaged by the arm 19 during its rotary movement, relatively staggered or offset in order to obtain the desired angular separation of the buttons as successively engaged by the arm. As shown, the buttons may be arranged as a pair of inner and outer concentric rows of buttons 31 and 33 each containing an equal number of buttons, although it will be obvious that the buttons may be arranged in more than two concentric rows, if desired, and that the concentric rows do not necessarily have to contain an equal number of buttons. Indeed, it is entirely feasible to include a larger number of buttons in an outer row so that the buttons of the inner row may be of larger diameter.

As shown, however, the inner and outer rows 31 and 33 contain an equal number of buttons, the inner row 31 comprising buttons of somewhat lesser diameter than those of the outer row 33. The buttons are equally spaced apart in both rows, the button spacement in each row being four degrees of arc, since there are ninety buttons in each row; and the buttons of the inner row are circularly staggered or offset with respect to the buttons of the outer row, the offsetting being such that the button engaging brushes on the arm 19 will alternately engage the successive buttons of the inner and outer rows as the arm traverses a rotary angle of two degrees between successive buttons during its rotary movement. Since the leading or button engaging edge of the brushes need not be disposed in precise radial alinement, but may be relatively offset, the staggered or offset displacement of the buttons of the circular rows 31 and 33 may likewise be adjusted to accommodate any non-radial alinement of the button wiping brushes of the arm; but if the leading edges of the brushes are in radial alinement on the arm, then the offset displacement of the buttons in the rows 31 and 33 should be such as to present the leading edges of the buttons in position relatively offset to the angular extent required.

In order to minimize the number of conductors required to interconnect the contact elements or buttons of the rotary switch with the selector stations 27, the rotary switch mechanism may be provided with thirty-six auxiliary contact elements or buttons 35, mounted on the panel 13 and equally spaced about the axis of the switch, the same preferably forming a single circular row of buttons disposed concentrically on the panel within the rows 31 and 33, the leading edge of each of said buttons 35 being circularly spaced with respect to the leading edge of the next adjacent button by an arcuate angle of ten degrees. As a consequence, each of the buttons 35 may subtend an arc embracing five adjacent circle dividing buttons 17, and hence may be employed in selecting or isolating the buttons 17 in successive groups each comprising five adjacent buttons. Accordingly, by selecting any one of the buttons 35, the corresponding five circle dividing buttons 17 may be isolated.

In addition to the buttons 35, the switch 11 may include four arcuate contact segments 37, 39, 41 and 43, mounted on the panel 13 and arranged in end-to-end abutting relationship around the axis of the rotary switch, preferably concentrically within the row of buttons 35, the abutting ends of the segments being very slightly separated to permit them to be electrically insulated each from the others. The segments 37, 39 and 41 each subtend an angle of one hundred degrees about the axis of the switch mechanism, while the segment 43 subtends an angle of sixty degrees. Accordingly, each of the one hundred degree segments 37, 39 and 41 subtend angles including successive groups of ten of the buttons 35, while the sixty degree segment 43 subtends an arc embracing the remaining six contact buttons of the row.

As a consequence, the segments 37, 39, 41 and 43 may be employed to isolate and hence to select corresponding groups of buttons 35. From a datum or starting position representing zero degree, the segment 37 may serve to isolate the buttons 35 contacted by the arm 19 in moving, from a cycle starting or zero position, to a position displaced one hundred degrees from such starting position. The second segment 39 serves to isolate the buttons 35 which are successively contacted by the arm 19 during its movement, from a position displaced one hundred degrees from the starting position, to a position displaced two hundred degrees from starting position. Similarly, the third segment 41 isolates the buttons 35 which are contacted by the arm 19 during its movement, from a position displaced from starting position by two hundred degrees, to a position displaced three hundred degrees from starting position, while the fourth segment 43 isolates the six buttons which are successively contacted by the arm 19, during the completion of its rotary movement, from a position displaced from the starting position by an angle of three hundred degrees. The rotary switch mechanism may also include a continuous power supply contact ring 45 disposed concentrically within the ring of segments. The contact ring 45, the segments 37, 39, 41 and 43, and each of the buttons 17 and 35 may be provided with rearwardly extending anchoring and connection studs extending in and through openings formed in the panel 13, said connection studs, on the side of the panel remote from the buttons 17 and 35 and the segment and ring, carrying connection means for electrical connection with bus conductors $a'$ through $z'$ and $+'$, which in turn are connected respectively with the terminals $a$ through $z$ and $+$.

The apparatus is adapted to be energized for operation, from a suitable source of electrical energy, through a power supply line comprising conductors L-1 and L-2. Suitable means, such as a connection terminal $\phi$, on the panel 13, and a conductor $\phi'$ connecting the terminal with the ring 45, may be provided for electrically connecting the ring 45 with one side L-1 of the power supply line.

The arm 19 may be provided with five electrically interconnected brushes in position respectively to wipingly engage the buttons of the rows 31, 33 and 35, and the segments 37, 39, 41 and 43, as well as the power supply ring 45, as the arm 19 is rotated in the performance of its monitoring cycle. The brushes may be of suitable sectional configuration and supported in correspondingly shaped slots 51 formed in the arm 19, with the long axis of the brush section extending tangentially with respect to its circular movement in the switch structure. If desired, each brush may have greater width than the next adjacent brush in a direction away from the rotary axis of the switch; and the leading edges of the brushes are preferably disposed in the arm in radial alinement with said rotary axis. Preferably, spring means may be provided for yieldingly urging the brushes, on the arm 19, in a direction to wipingly press the brushes upon the buttons 31, 33 and 35, upon the segments 37, 39, 41 and 43, and upon the ring. As a consequence, as the arm rotates, the buttons 17, the buttons 35, and the segments will be connected successively with one side of the power source, through the arm 19 and the supply ring 45.

As shown in FIG. 3 of the drawings, the hundred degree segments 37, 39 and 41, and the sixty degree segment 43, are respectively connected with the terminals $x$, $y$, $z$ and $+$, as by means of conductors $x'$, $y'$, $z'$ and $+'$. The ten degree buttons 35 are electrically interconnected in groups of one, two and four, for connection with the terminals $k$ through $u$, by means of bus conductors $k'$ through $u'$. To this end, the zero or 360° button, together with the 200° button, may be connected with the terminal k by bus conductor k'. The ten degree buttons, that is to say the 10°, 110°, 210° and 310° buttons, may all be connected with the terminal l, by bus conductor l'. The twenty, thirty, forty, sixty, seventy and eighty degree buttons likewise may be connected respectively with the terminals m, n, o, q, r and s by corresponding bus conductors m', n', o', q', r', and s'. The 50° and 250° buttons may be connected to the terminal p by bus conductor p', while the 150° and 350° buttons are connected with the terminal v by bus conductor v'. The 90° and 290° buttons may be connected with the terminal t by bus conductor t', while the 190° button is connected by conductor w' to the terminal w, the 100° and 300° buttons being connected with the terminal u by bus conductor u'.

The two degree contact buttons 17 are electrically interconnected in groups for connection with the first ten cable connection terminals a through j. To this end, the one hundred eighty contact buttons 17 may be interconnected, in ten groups containing eighteen buttons each, the buttons of the groups being connected to bus conductors a' through j' which, in turn, are electrically connected with the corresponding terminals a through j. Starting from a zero or datum position, successive contact buttons, in groups of ten, may be respectively connected to the ten bus conductors, a' through j', so that eighteen contact buttons are connected with each bus conductor, the buttons so connected to any one conductor being angularly spaced twenty degrees apart, in the monitor switch. In short, the ten buttons 17 which subtend any twenty degree segment of the switch are respectively connected with the conductors a' through j'.

Figure 4:
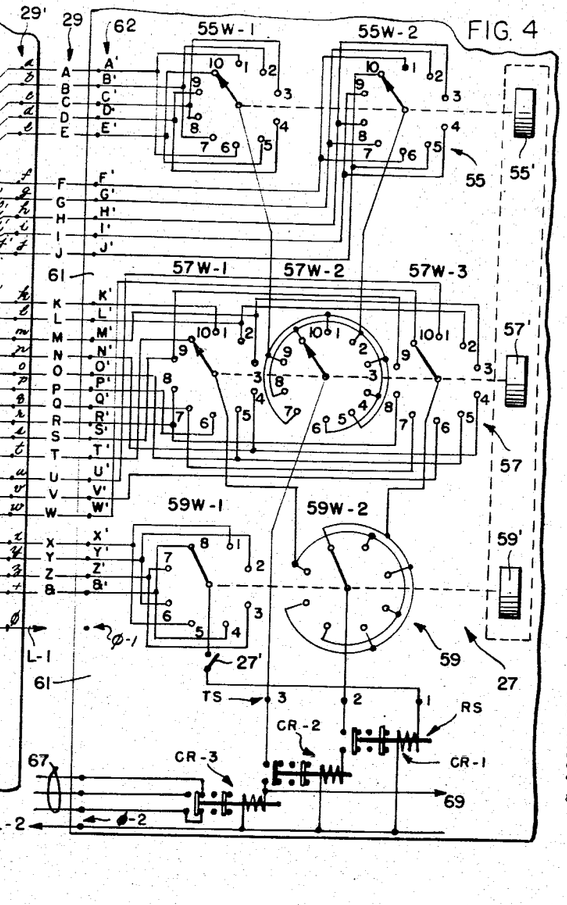
FIG. 4 is a diagram of electrical connections showing the manner in which a selector switch of the sort shown in FIG. 1 may be interconnected with the rotary monitoring switch of FIG. 3 and with associated relays.

Any desired or required number of command station selector switch assemblies 27 may be connected in parallel relation with the conductors 29 of the connection cable, two assemblies being shown in FIG. 1. As shown in FIG. 4, each command station switch assembly 27 may comprise three selector switches 55, 57 and 59 respectively adjustable, as by means of manually operable wheels 55', 57' and 59', to select a desired group of the two degree buttons 17, to select a desired group of the ten degree buttons 35, and to select one of the four segments 37, 39, 41 and 43 for connection with the relay switches CR–1, CR–2 and CR–3 for the operation thereof.

The switches 55 and 57 may conveniently comprise wafer switches having ten switch positions defined by contact buttons numbered from one to ten, the switch 59 comprising wafers having eight switch positions defined by contact buttons numbered from one to eight. The switches 55 and 59 each embody two wafers respectively identified as wafers 55W–1 and 55W–2, of the switch 55, and wafers 59W–1 and 59W–2, of the switch 59, the switch 57 preferably comprising three wafers 57W–1, 57W–2 and 57W–3.

The selector and relay switches 27 and RS may be mounted upon a suitable support structure 61. The support structure, also, may carry a plurality of connection terminals respectively identified in the drawings by reference characters A' through Z' and &' and adapted respectively for attachment with the corresponding conductors A through Z and & of the connection cable. The diametrically opposite contact buttons 1–6, 2–7, 3–8, 4–9 and 5–10 of the switch wafers 55W–1 and 55W–2 are electrically interconnected and are also connected respectively with the terminals A' through J', whereby said interconnected buttons of the switch wafer 55W–1 may be connected through the conductors of the connection cable respectively with the two degree contact buttons 17 of the monitor switch that are connected with the bus conductors a', b', c', d' and e', while said interconnected buttons of the switch 55W–2 may be connected through the conductors of the connection cable respectively with the two degree contact buttons of the monitor switch that are connected with the bus conductors f', g', h', i', and j'. The rotary switch arms of the wafers 55W–1 and 55W–2 are mechanically connected together and to the operating wheel 55' so that the arms will move in unison to simultaneously engage the correspondingly numbered contact buttons of both wafers.

The buttons of the switch wafers 57W–1 and 57W–3 are interconnected with the terminals K' through W' and hence through the conductors of the connection cable with the ten degree contact buttons 35 of the monitor switch, as indicated in the following chart:

| Wafers | Buttons | Connected to Terminals— |
|---|---|---|
| 1 | 1 | K' |
| 1 & 3 | 2 | L' |
| 1 & 3 | 3 | M' |
| 1 & 3 | 4 | N' |
| 1 & 3 | 5 | O' |
| 1 | 6 | P' |
| 1 & 3 | 7 | Q' |
| 1 & 3 | 8 | R' |
| 1 & 3 | 9 | S' |
| 1 | 10 | T' |
| 3 | 1 | U' |
| 3 | 6 | V' |
| 3 | 10 | W' |

The odd numbered buttons of the switch wafer 57W–2 are electrically connected together and to the rotary arm of the switch wafer 55W–1, while the even numbered buttons of said wafer 57W–2 are also electrically connected together and to the rotary arm of the switch wafer 55W–2. The rotary switch arms of the wafers 57W–1, 57W–2 and 57W–3 are mechanically connected together and to the operating wheel 57' so that the arms will move in unison to simultaneously engage the correspondingly numbered contact buttons of said wafers.

The diametrically opposite buttons 1–5, 2–6, 3–7 and 4–8 of the wafer switch 59W–1 are electrically interconnected and are also connected respectively with the terminals X', Y', Z' and &', whereby said interconnected buttons may be connected through the conductors of the connection cable respectively with the segments 37, 39, 41 and 43 which are connected with the conductors x', y', z' and +'. The odd numbered buttons of the switch wafer 59W–2 are electrically connected together and to the rotary arm of the switch wafer 57W–1, while the even numbered buttons of said wafer 59W–2 are also electrically connected together and to the rotary arm of the switch wafer 57W–3. The rotary switch arms of the wafers 59W–1 and 59W–2 are mechanically connected together and to the operating wheel 59' so that the arms will move in unison to simultaneously engage the correspondingly numbered contact buttons of such wafers.

The support structure 61 may be provided with a terminal φ–2 for connection with the conductor L–2 of the power supply line. The rotary switch arm of the wafer 59W–1 may be connected with the terminal φ–2 through the conditioning switch 27' and the actuating coil of the normally open relay switch CR–1. The rotary switch arm of the wafer 59W–2 may be connected with the terminal φ–2 through the normally open contactor of the relay CR–1 and the actuating coil of the relay switch CR–2. The rotary switch arm of the wafer 57W–2 may be connected with the terminal φ–2 through the normally open contactor of the relay switch CR–2 and the actuating coil of the relay CR–3.

The power supply conductor L–1 may be connected directly to the terminal φ on the support panel 13 of the monitor switch 11, as shown in FIG. 3. Alternately, the support structure 61, at the command station 27, may be provided with a terminal φ–1; and the cable 29 may include an extra conductor (not shown) for connecting the terminal φ (FIG. 3) with the terminal φ–1 (FIG. 4), thus permitting both of the power supply conductors L–1 and L–2 to be connected in the system at adjacent terminals φ–1 and φ–2, at the command station 27. If desired, a similar arrangement may be used for connecting both power supply conductors in the system by means of a pair of connection terminals on the panel 13 of the monitor switch.

Conductor means 67, connected with the contacts of the relay CR–3, may be provided for connecting the same in external relay circuits containing operable devices to be energized from a suitable power source or sources, by operation of the relays RS, under the control of the monitor switch 11 as conditioned for service by the selector switch means 27. A conductor 69 may also be connected to the side of the actuating coil of the relay switch CR–3 remote from the terminal φ–2, to permit the said relay switch to be controlled, if desired, by other means than the selector switch assembly 27 with which it is associated, as, for example, by another or other associated selector switch assemblies.

So long as the conditioning switch 27' remains open, the associated selector switch means 27 remains inactive despite continuous rotation of the arm 19. The switch 27' being closed, however, the actuating coil of the relay CR–1 will become energized to close its associated contactor, as soon as the arm 19, during its rotation, shall have come into engagement with the segment 37, 39, 41 or 43 that has been selected by adjustment of the switch 59. Closure of the contactor of the relay CR–1 will permit the actuating coil of the relay CR–2 to become energized to close its associated contactor, as soon as the arm 19, during its rotary movement, shall have become engaged with the ten degree button 35, isolated by adjustment of the selector switch 57, within that segment of the monitor switch structure subtended by the segment selected by adjustment of the selector switch 59. Closure of the contacts of the relay CR–2 will permit the actuating coil of the relay CR–3 to become energized to operate its contacts for the control of the external relay circuits connected with said contacts, as soon as the arm 19, during its rotation, shall have engaged the two degree button 17, isolated by adjustment of the selector switch 55, within that segment of the monitor switch structure subtended by the ten degree button selected by adjustment of the selector switches 57 and 59.

It will be seen from the foregoing that the selector switches 55, 57 and 59 of each selector switch assembly 27 may be adjusted to isolate any desired one of the circle dividing buttons 17 and condition the system to actuate the relay switch CR–3 for the operation of the connected external relay circuitry at the precise instant when the arm in its rotary movement comes into engagement with the so isolated circle dividing button, that is to say, at an exactly predetermined instant during the cyclic operation or procedure being monitored. The automation switching system of the present invention may be applied usefully in connection with the operation of many and various kinds of cyclically operable apparatus, including material working presses of all kinds, machine tools, iron hand control mechanism, feed control apparatus, spray devices, any auxiliary device or facility needed to be actuated at a precise moment during the operating cycle of a cyclically operable machine, and any other equipment that requires a presettable or adjustable while in motion contact making device that may be set to operate at any desired angular position around a complete circle.

Figure 5:
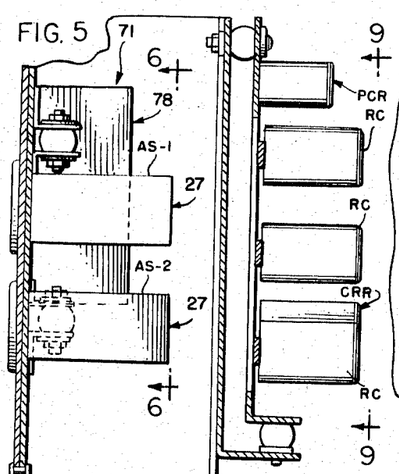
FIG. 5 is a sectional view taken substantially along the line 5—5 in FIG. 1.
Figure 6:
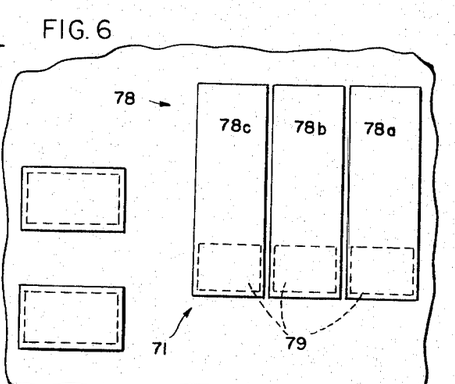
FIG. 6 is a sectional view taken substantially along the line 6—6 in FIG. 5.

In order to provide for visually indicating the momentary angular positions of the monitoring switch 11 during its rotation, and thereby afford visual indication of the progress of a cyclically operable device with which the switch is drivingly connected, the present invention contemplates a visual indicator of the sort shown in FIGS. 1, 5 and 6, the same conveniently comprising a three digit display apparatus 71 adapted to visually show numerals representing angularities up to three hundred and sixty degrees.

As shown more particularly in FIG. 1 of the drawings, the display apparatus may comprise a panel 72 which may be mounted within a box or housing 73 adapted to be supported in any convenient fashion at a convenient viewing station. The box may be provided with a cover 74 hinged on the box along one edge, as at 75, and having means 76 provided at the other edge of the cover for latching or locking the same in closed position overlying the panel 72, said cover 74 being provided with a window opening 77 through which the display apparatus 71 may be viewed from outwardly of the mounting box.

When used in conjunction with a circle dividing monitoring switch of the sort shown in FIGS. 2 and 3, containing contact elements 17 arranged to subdivide the circle into one hundred and eighty components, each subtending two degrees, the display apparatus 71 is preferably arranged to indicate all angularities from zero to three hundred and sixty degrees, by two degree increments. Accordingly, the display apparatus 71 may comprise three adjacent display units 78, of the sort shown in FIG. 7, disposed in side-by-side relationship, with one of said units 78b disposed between two other units, 78a and 78c. These units may each conveniently comprise a projection type readout device of the sort manufactured by Industrial Electronic Engineers, Inc. of North Hollywood, California, the same consisting of a display panel 79 and associated projection equipment 80 for selectively displaying indicia characters, such as the ten digits from one to nine and zero, in position to be viewed on the panel, in response to selective actuation of the associated equipment 80. To this end, the units 78 may be mounted on the back of the panel 72 in position exposing the display panels 79 of the units through a window opening 81 formed therein.

Figure 7:
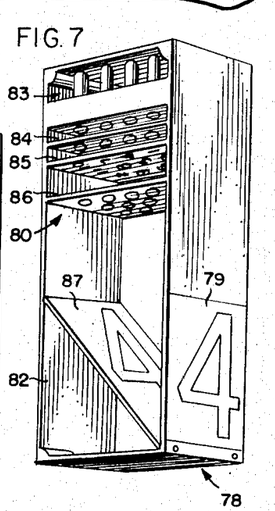
FIG. 7 is a perspective view of a component of the readout apparatus.

Each of the units 78 may comprise a preferably box-like housing or frame 82 carrying the display panel 79 and a bank of lamps 83 arranged in three columns containing four lamps in each column, the lamps being mounted within the frame at one end thereof in position each to emit a beam of light through a corresponding perforation in a panel 84 mounted within the box-like housing in front of the lamp bank. Projection readout devices, as supplied by the manufacturer, each include a digit screen 85 having light transmitting portions in the form of digits from one to twelve disposed respectively in front of and in alinement with the light beam openings of the panel 84.

For the purpose of the present invention, the readout device 71 requires the selective display of digits 0, 1, 2, and 3 by the unit 78a; of digits 1 to 9 and zero by the unit 78b; and of the digits 2, 4, 6, 8 and zero by the unit 78c. Accordingly, the digit carrying screen 85 may be modified to substitute the digit zero for the digit ten in the display units 78. Each unit also contains a panel 86 containing projection openings in alinement with the openings in panel 84 and with the indicia on the projection screen 85, the openings of the panel 86 being provided each with projection lens means for transmitting a beam of light, carrying the image of the corresponding indicia applied therein by the screen 85, the indicia carrying beam projected through any of the projection lenses being reflected upon the back of the display panel 79, as by means of a mirror 87.

Figure 8:
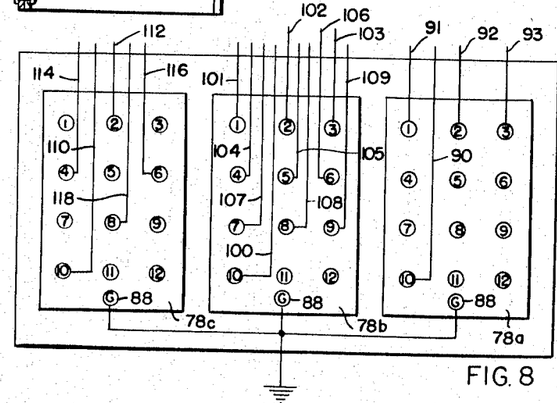
FIG. 8 is a diagram of electrical connections for the readout apparatus.

As shown more particularly in FIG. 8 of the drawings, the connection terminals of the lamps 83 of the three display devices 78a, 78b and 78c may be connected for the actuation only of those lamps required to project the digits 1, 2, 3 and zero on the display screen 79 of the unit 78a; the digits 1 through 9 and zero on the screen 79 of the unit 78b; and the digits 2, 4, 6 ,8 and zero on the screen 79 of the unit 78c. The lamp terminals marked with the numeral 10, in FIG. 8, correspond with the lamps for projecting the character zero upon the screens of the units when energized.

One energy supply terminal of each of the projection lamps of the units 78a, 78b and 78c is connected to a grounded conductor 88, while the remaining supply terminals of the lamps are connected with energizing conductors as follows:

| Projection Unit | Digit Projection Lamp | Connected Conductor |
|---|---|---|
| 78a | 1 | 91 |
|  | 2 | 92 |
|  | 3 | 93 |
|  | 10 | 90 |
|  | 4-9, 11 and 12 | Not Connected |
| 78b | 1 | 101 |
|  | 2 | 102 |
|  | 3 | 103 |
|  | 4 | 104 |
|  | 5 | 105 |
|  | 6 | 106 |
|  | 7 | 107 |
|  | 8 | 108 |
|  | 9 | 109 |
|  | 10 | 100 |
|  | 11 and 12 | Not Connected |
| 78c | 2 | 112 |
|  | 4 | 114 |
|  | 6 | 116 |
|  | 8 | 118 |
|  | 10 | 110 |
|  | 1, 3, 5 and 7 | Not Connected |
|  | 9, 11 and 12 | Not Connected |

The present invention contemplates the provision of means for connecting the nineteen lamp energizing conductors, 90, 91, 92, 93; 100 through 109; 110, 112, 114, 116 and 118, selectively with a suitable source of lamp energizing power under the control of the rotary monitoring switch 11, whereby to energize the lamps and display appropriate numbers upon the viewing screens 79 thereof to indicate the momentary position of the rotary switch arm as it engages the contacts 17 of the switch successively during a complete rotation of the arm. To this end, the energizing circuits of the projection lamps are controlled by the nineteen relays RC and the two relays CRR shown in FIGS. 9 and 18, the same, together with six relays RS, being mounted on a panel 89 enclosed within the box 73 behind the display panel 72.

In this connection, it should be noted that, although there are one hundred and eighty segments each subtending two degrees, in a circle, the present invention provides for indicating any or all of the one hundred and eighty positions by means of but twenty-seven conductors connecting the circle dividing rotary switch 11 with the relays CRR-1 and CRR-2 and the nineteen relays RC which actuate the nineteen lamps 83 of the three display indicators 78.

Figures 10, 11:
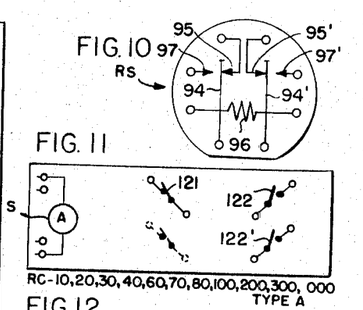
FIGS. 10 through 16 are electrical diagrams of the relays shown in FIG. 9.

As shown more particularly in FIG. 10, the six relays RS may each comprise a double-pole, double-throw switch having a pair of blades 94, 94', each normally engaging a corresponding contact 95, 95', forming normally closed switches with said blades, and an actuating coil 96 which, when electrically energized, serves to disengage the blades 94, 94' from the normally closed switch contacts 95, 95' and to engage said blades with normally open switch contacts 97, 97'.

The relays RC-000, RC-100, RC-200, RC-300, RC-10, RC-20, RC-30, RC-40, RC-60, RC-70 and RC-80, as shown in FIG. 11, may each comprise a normally closed switch, a pair of normally open switches, and an actuating coil SA which, when electrically energized, will cause the normally closed switch to open and the normally open switches to close. These relays will hereinafter be called Type A relays.

Figures 12, 13, 14:
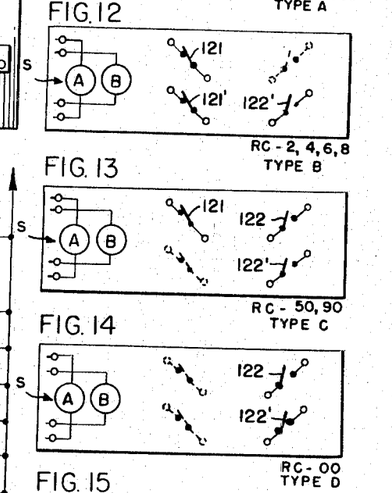

The relays RC-2, RC-4, RC-6 and RC-8, as shown in FIG. 12, may each comprise a pair of normally closed switches and a single, normally open switch. These relays will hereinafter be called Type B relays.

The relays RC-50 and RC-90, as shown in FIG. 13, may each comprise a normally closed switch and a pair of normally open switches. These relays will hereinafter be called Type C relays.

Figures 15, 16:
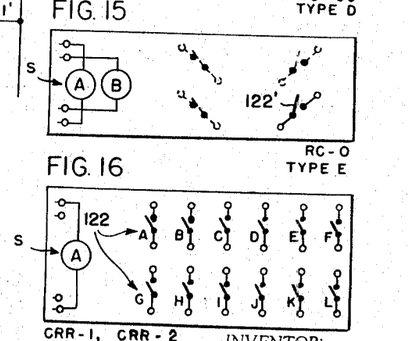

The relay RC-00, as shown in FIG. 14, may comprise a pair of normally open switches, and the relay RC-0, as shown in FIG. 15, may comprise a single, normally open switch. These relays will hereinafter respectively be called Type D and Type E relays.

The Type B, C, D and E relays may also each comprise a pair of actuating coils, either of which, when electrically energized, will cause the normally closed switches to open and the normally open switches to close.

The relays RC, of course, may be individually constructed each to provide the specified number of normally open and normally closed switches and either one or two actuating coils, but it is preferable to utilize identical switch structures each embodying at least a pair of normally open and normally closed switches and a pair of actuating coils, and to connect in circuit only such of the normally open and normally closed switches and actuating coils as are required. As shown more particularly in FIGS. 11-15, the several relays may comprise normally open and normally closed switches and actuating coils in accordance with the following tabulation:

| Relay Type | Actuating Coil | Normally Closed Switch | Normally Open Switch | Drawing Fig. |
|---|---|---|---|---|
| A | SA | 121 | 122, 122' | 11 |
| B | SA, SB | 121, 121' | 122' | 12 |
| C | SA, SB | 121 | 122, 122' | 13 |
| D | SA, SB |  | 122, 122' | 14 |
| E | SA, SB |  | 122' | 15 |

As shown more particularly in FIG. 16, each of the relays CRR-1 and CRR-2 may comprise twelve normally open switches, 122-A through 122-L, and a single actuating coil SA which, when energized, will cause all of the normally open switches to close.

Figure 18:
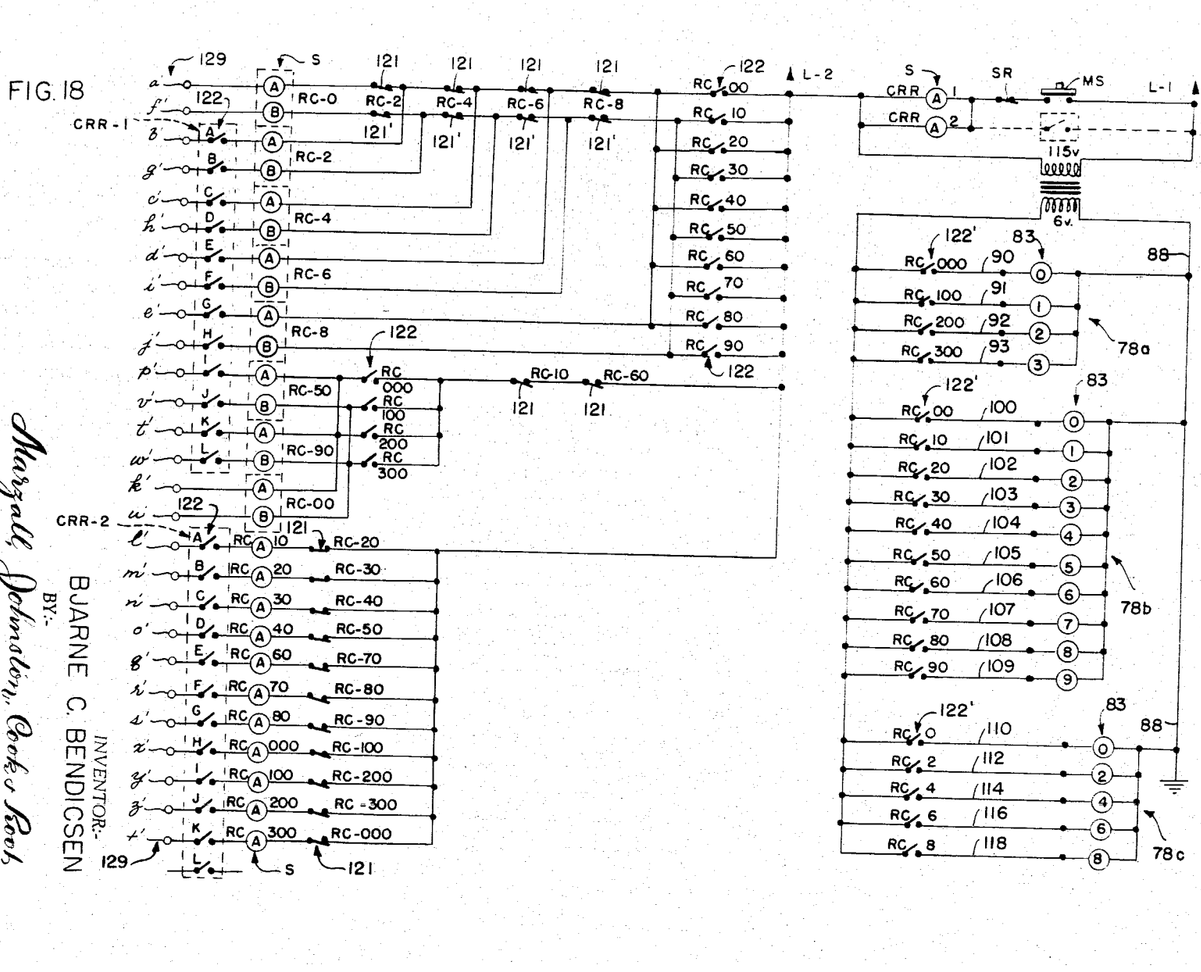
FIG. 18 is a diagram showing the electrical interconnection of the indicators of the visual readout apparatus with the rotary monitoring switch, by means of associated relays.

The twenty-seven terminals 29a' through 29z' and 29+', of the rotary, circle dividing switch 11, may be connected with the relays CRR and RC, as by means of a suitable cable 129 containing at least twenty-seven conductors, a' through z' and +', as shown in FIG. 18 of the drawings.

The conductor 129a' is connected directly through the actuating coil SA of the relay RC-0 and thence to the power supply conductor L-2, in series through the normally closed switches 121 of the relays RC-2, RC-4, RC-6 and RC-8, and the normally open switches 122 of the relays RC-00, RC-20, RC-40, RC-60 and RC-80, interconnected in parallel relation.

The conductor 129f' is connected directly through the actuating coil SB of the relay RC-0 and thence to the power supply conductor L-2, in series through the normally closed switches 121' of the relays RC-2, RC-4, RC-6 and RC-8, and the normally open switches 122 of the relays RC-10, RC-30, RC-50, RC-70 and RC-90, interconnected in parallel relation.

The conductor 129b' is connected with the actuating coil SA of the relay RC-2 through the normally open switch 122A of the relay CRR-1, and thence through the power supply conductor L-2, in series through the normally closed switches 121 of the relays RC-4, RC-6 and RC-8 and the normally open switches 122 of the relays RC-00, RC-20, RC-40, RC-60 and RC-80, interconnected in parallel relation.

The conductor 129g' is connected with the actuating coil SB of the relay RC-2 through the normally open switch 122B of the relay CRR-1, and thence to the power supply conductor L-2, in series through the normally closed switches 121' of the relays RC-4, RC-6 and RC-8 and the normally open switches 122 of the relays RC-10, RC-30, RC-50, RC-70 and RC-90, interconnected in parallel relation.

The conductor 129c' is connected with the actuating coil SA of the relay RC-4 through the normally open switch 122C of the relay CRR-1, and thence to the power supply conductor L-2, in series through the normally closed switches 121 of the relays RC-6 and RC-8 and the normally open switches 122 of the relays RC-00, RC-20, RC-40, RC-60 and RC-80, interconnected in parallel relation.

The conductor 129h' is connected with the actuating coil SB of the relay RC-4 through the normally open switch 122D of the relay CRR-1, and thence to the power supply conductor L-2, in series through the normally closed switches 121' of the relays RC-6 and RC-8 and the normally open switches 122 of the relays RC-10, RC-30, RC-50, RC-70 and RC-90 interconnected in parallel relation.

The conductor 129d' is connected with the actuating coil SA of the relay RC-6 through the normally open switch 122E of the relay CRR-1, and thence to the power supply conductor L-2, in series through the normally closed switch 121 of the relay RC-8 and the normally open switches 122 of the relays RC-00, RC-20, RC-40, RC-60 and RC-80, interconnected in parallel relation.

The conductor 129i' is connected with the actuating coil SB of the relay RC-6 through the normally open switch 122F of the relay CRR-1, and thence to the power supply conductor L-2, in series through the normally closed switch 121' of the relay RC-8 and the normally open switches 122 of the relays RC-10, RC-30, RC-50, RC-70 and RC-90, interconnected in parallel relation.

The conductor 129e' is connected with the actuating coil SA of the relay RC-8 through the normally open switch 122G of the relay CRR-1, and thence to the power supply conductor L-2, through the normally open switches 122 of the relays RC-00, RC-20, RC-40, RC-60 and RC-80 interconnected in parallel relationship.

The conductor 129j' is connected with the actuating coil SB of the relay RC-8 through the normally open switch 122H of the relay CRR-1, and thence to the power supply conductor L-2, through the normally open switches 122 of the relays RC-10, RC-30, RC-50, RC-70 and RC-90 interconnected in parallel relationship.

The conductor 129p' is connected with the actuating coil SA of the relay RC-50 through the normally open switch 122I of the relay CRR-1, and thence to the power supply conductor L-2, through the normally open switches 122 of the relays RC-000 and RC-200, connected in parallel relation, and then in series through the normally closed switches 121 of the relays RC-10 and RC-60.

The conductor 129v' is connected with the actuating coil SB of the relay RC-50 through the normally open switch 122J of the relay CRR-1, and thence to the power supply conductor L-2, through the normally open switches 122 of the relays RC-100 and RC-300, connected in parallel relation, and then in series through the normally closed switches 121 of the relays RC-10 and RC-60.

The conductor 129t' is connected with the actuating coil SA of the relay RC-90 through the normally open switch 122K of the relay CRR-1, and thence to the power supply conductor L-2, through the normally open switches 122 of the relays RC-000 and RC-200, connected in parallel relation, and then in series through the normally closed switches 121 of the relays RC-10 and RC-60.

The conductor 129w' is connected with the actuating coil SB of the relay RC-90 through the normally open switch 122L of the relay CRR-1, and thence to the power supply conductor L-2, through the normally open switches 122 of the relays RC-100 and RC-300, connected in parallel relation, and then in series through the normally closed switches 121 of the relays RC-10 and RC-60.

The conductor 129k' is connected directly through the actuating coil SA of the relay RC-00, and thence to the power supply conductor L-2, in series through the normally open switches 122 of the relays RC-000 and RC-200, connected in parallel relation, and then in series through the normally closed switches 121 of the relays RC-10 and RC-60.

The conductor 129u' is connected directly through the actuating coil SB of the relay RC-00, and thence to the power supply conductor L-2, in series through the normally open switches 122 of the relays RC-100 and RC-300, connected in parallel relation, and then in series through the normally closed switches 121 of the relays RC-10 and RC-60.

The conductor 129l' is connected with the actuating coil SA of the relay RC-10 through the normally open switch 122A of the relay CRR-2, and thence to the power supply conductor L-2 through the normally closed switch 121 of the relay RC-20.

The conductor 129m' is connected with the actuating coil SA of the relay RC-20 through the normally open switch 122B of the relay CRR-2, and thence to the power supply conductor L-2, through the normally closed switch 121 of the relay RC-30.

The conductor 129n' is connected with the actuating coil SA of the relay RC-30 through the normally open switch 122C of the relay CRR-2, and thence to the power supply conductor L-2, through the normally closed switch 121 of the relay RC-40.

The conductor 129o' is connected with the actuating coil SA of the relay RC-40 through the normally open switch 122D of the relay CRR-2, and thence to the power supply conductor L-2, through the normally closed switch 121 of the relay RC-50.

The conductor 129q' is connected with the actuating coil SA of the relay RC-60 through the normally open switch 122E of the relay CRR-2, and thence to the power supply conductor L-2, through the normally closed switch 121 of the relay RC-70.

The conductor 129r' is connected with the actuating coil SA of the relay RC-70 through the normally open switch 122F of the relay CRR-2, and thence to the power supply conductor L-2, through the normally closed switch 121 of the relay RC-80.

The conductor 129s' is connected with the actuating coil SA of the relay RC-80 through the normally open switch 122G of the relay CRR-2, and thence to the power supply conductor L-2, through the normally closed switch 121 of the relay RC-90.

The conductor 129x' is connected with the actuating coil SA of the relay RC-000 through the normally open switch 122H of the relay CRR-2, and thence to the power supply conductor L-2, through the normally closed switch 121 of the relay RC-100.

The conductor 129y' is connected with the actuating coil SA of the relay RC-100 through the normally open switch 122I of the relay CRR-2, and thence to the power supply conductor L-2, through the normally closed switch 121 of the relay RC-200.

The conductor 129z' is connected with the actuating coil SA of the relay RC-200 through the normally open switch 122J of the relay CRR-2, and thence to the power supply conductor L-2, through the normally closed switch 121 of the relay RC-300.

The conductor 129+' is connected with the actuating coil SA of the relay RC-300 through the normally open switch 122K of the relay CRR-2, and thence to the power supply conductor L-2, through the normally closed switch 121 of the relay RC-000.

In order to energize the lamps 83 of the display units 78, the same may each be connected in series with the normally open switch 122' of the relay RC, which corresponds with the lamp. Thus, the lamps for projecting the digits zero, one, two and three, in the display unit 78a, may be respectively connected in series with the switches 122' of the relays RC-000, RC-100, RC-200 and RC-300, through the conductors 90 through 93, while the lamps for projecting the digits zero and one through nine, in the display unit 78b, may be connected respectively in series with the switches 122' of the relays RC-00, RC-10, RC-20, RC-30, RC-40, RC-50, RC-60, RC-70, RC-80 and RC-90, through the conductors 100 through 109, the lamps for projecting the digits zero, two, four, six and eight, in the display unit 78c, being respectively connected in series with the switches 122' of the relays RC–0, RC–2, RC–4, RC–6 and RC–8, through the conductors 110, 112, 114, 116 and 118. The several series circuits comprising the switches 122' and the lamps 83 connected therewith are interconnected in parallel with a source of suitable lamp energizing power, such as the secondary winding W of a transformer T, the primary winding P of which may be energized by connection with the power supply conductors L–1 and L–2, through a disconnect switch (not shown), if desired.

The relays CRR–1 and CRR–2 serve as control switches operable to condition the energizing circuits of the relays RC for operation and alternately to disable the same. To this end, the actuating coils SA of the relays CRR–1 and CRR–2 may be interconnected in parallel so that the relays may be energized and deenergized in unison under the control of a manually operable switch MS and a normally closed relay switch SR under the control of the monitored apparatus and adapted to open when the apparatus is in operation. Such an arrangement may be useful where the monitored apparatus is a forming press, for example, in order to permit the indicating apparatus to function only when the press is at rest. Of course, the relay switch SR may be omitted if the indicating apparatus is to operate while the monitored apparatus is in motion; and a switch, as shown in dotted lines in FIG. 18, may be provided to energize the actuating coils SA of the relays CRR–1 and CRR–2 whenever and so long as the switch remains in closed position, whether the monitored device is at rest or in motion.

The relays RC–0, RC–2, RC–4, RC–6, RC–8, RC–50, RC–90 and RC–00 have double wound actuating coils SA and SB, in order to provide for the circumstances that require the lamps of the display unit 78c to be energized not only when the arm 19 of the rotary switch 11 engages the contacts of the outer row 33, which are connected with bus conductors a' through e', but also when the switch arm engages the corresponding contacts of the inner row, which are connected with bus conductors f' through j'; and the further circumstances that require the lamps, which project the digits zero, five and nine of the display unit 78b, to be energized not only when the arm 19 of the rotary switch 11 engages the contacts "0" and "200," connected with bus conductor k', the contacts marked "50" and "250," connected with bus conductor p', and the contacts marked "90" and "290," connected with bus conductor t', in the contact row 35 but also when the arm of the switch engages the contacts marked "100" and "300," connected with bus conductor u', the contacts marked "150" and "350," connected with bus conductor v', and the contacts marked "190," connected with bus conductor w'.

In order to avoid the possibility of having two digit display lamps 83 of any one of the units 78 in simultaneous operation, the relays RC are each interlocked with the next successively operated relay, so that both may not be simultaneously activated to energize the corresponding lamps 83. Thus, the actuating coils SA of relays RC–10, RC–20, RC–30, RC–40, RC–60, RC–70, RC–80, RC–000, RC–100, RC–200 and RC–300 are each connected in series respectively with the normally closed switches 121 of relays RC–20, RC–30, RC–40, RC–60, RC–70, RC–80, RC–90, RC–100, RC–200, RC–300 and RC–000, so that as the coil of each relay is energized to open its normally closed switch 121, the coil of the previously actuated relay will be disconnected from the power source and the lamp 83 controlled thereby will be disabled.

The coils SA and SB of the relay RC–0 are respectively in series with the normally closed switches 121 and 121' of the relays RC–2, RC–4, RC–6 and RC–8, so that the zero showing device of the display unit 78c may be energized only when none of the other digit showing devices is in operation. The digit two may be shown only when the four, six and eight display devices are inactive. The digit four may be displayed only when the six and eight showing devices are inactive. The digit six may be shown only when the eight display device is inactive. The actuating coils SA and SB of the relays RC–0, RC–2, RC–4, RC–6 and RC–8, respectively, can not be energized unless one of the relays RC–00, RC–20, RC–40, RC–60 and RC–80, or one of the relays RC–10, RC–30, RC–50, RC–70 and RC–90 is in energized condition to close a switch 122.

The coils SA and SB of the relays RC–50, RC–90 and RC–00 can not be energized when either the relay RC–10 or the relay RC–60 is energized to open the normally closed switches 121 of said relays. Furthermore, the coils SA of the relays RC–50, RC–90 and RC–00 can be energized only if relays RC–000 and RC–200 are also energized to close their normally open switches 122. Likewise, the coils SB of relays RC–00, RC–50 and RC–90 can be energized only if relays RC–100 and RC–300 are also energized to close their normally open switches 122.

The contact selecting assemblies AS–1 and AS–2, as shown in FIG. 1, may comprise wafer switches of the sort shown at 55, 57 and 59 in FIG. 4 of the drawings, said assemblies being mounted on the panel 72, adjacent the display window 81, so as to serve as press holding and press stopping selector means adjustable by the operation of the controlled apparatus while in position to view the position indicating panels 79 of the display devices 78 in the window 81.

A press holding circuit may comprise a system of the sort shown in FIG. 4, wherein the relays RS are connected to prevent the press or other controlled apparatus from operating during a selected portion of its operating cycle, such as the initial portions thereof, unless the operator of the press has both hands in position holding pushbutton switches closed. Where applied in a press, the holding circuit may be adjusted so that the hands of the pressman must be on the manual switches while the jaws of the press are closing, thereby preventing the danger of press mangled hands. By adjusting the wafer switches of the selecting assembly AS–1 of the press holding circuit 27, the extent of the holding interval as a desired portion of the complete operating cycle may be instantly adjusted.

A press stopping circuit may comprise a system of the sort shown in FIG. 4, wherein the relays RS are connected to apply a press stopping brake, or otherwise initiate press stopping action at a time, during the operating cycle of the controlled apparatus, such as will bring the same to rest at a desired position on the circle, as for example the zero or starting position. In order to accomplish the desired result, the wafer switches of the selecting assembly AS–2 of the press stopping circuit 27 may be adjusted to initiate stopping action at any desired angular position on the 360 degree circle representing the operating cycle of the controlled device. If, at any selected stop action initiating position, set at the selector switches of the assembly AS–2, the controlled apparatus should be found to stop at a position other than the desired position, the stop position may be instantly determined by viewing the screens of the position indicating apparatus 71. The displacement of the stop position of the controlled apparatus from the desired position may be determined promptly and the switches of the assembly AS–2 adjusted accordingly. Thus, if the controlled apparatus overruns or stops short of the desired stopping position by, say, a displacement of eight degrees, the adjustable switches AS–2 merely have to be set back or advanced by the same angular displacement to cause the apparatus to come to rest precisely at the desired stopping position.

As shown in FIG. 4, the circuitry 27 may be provided with connection terminals TS–1, TS–2 and TS–3, respectively connected with the blades of the selector switches 59W–1, 59W–2 and 57W–2, to facilitate connection thereof with the relays CR–1, CR–2 and CR–3.

Figure 17:
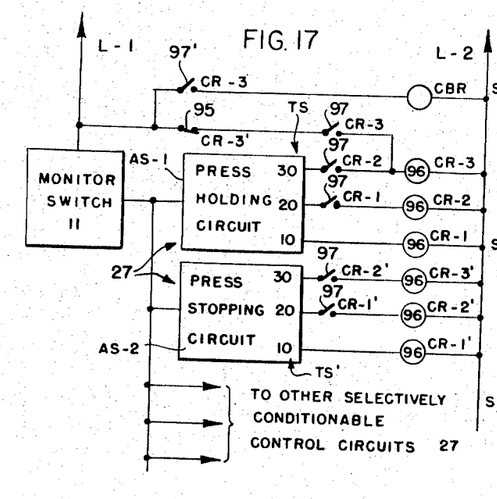
FIG. 17 is an electrical diagram showing the interconnection of the rotary monitoring switch shown in FIGS. 2 and 3 with the selector switches shown in FIGS. 1 and 4 and with associated relays.

As shown in FIG. 17, the actuating coils 96 of the relays CR–1 and CR–1' of the press holding and press stopping systems AS-1 and AS-2 are respectively connected between the power supply conductor L-2 and the blades of the switches 59W-1 of said system through the terminals TS-1 thereof. The actuating coils 96 of the relays CR-2 and CR-2' are respectively connected between the conductor L-2 and the blades of the switches 59W-2 through the normally open switches 97 of the relays CR-1 and CR-1' and the terminals TS-2. The actuating coils 96 of the relays CR-3 and CR-3' are respectively connected between the conductor L-2 and the blades of the switches 57W-2 through the normally open switches 97 of the relays CR-2 and CR-2' and the terminals TS-3. The normally open switch 97' of the relay CR-3 may be connected in series with the actuating coil of a relay CBR, the switches of which are connected in circuits (not shown) of suitable character for actuating the monitored apparatus under the control of a pair of normally open, manually closable switches.

The actuating coil 96 of the relay CR-3 of the press holding system may also be energized independently of the press holding system AS-1, in order to maintain closed its normally open switch 97' after the switch 11 shall have passed by the position selected by adjustment of the system AS-1. To this end, the actuating coil 96 of the relay CR-3 may be connected with the supply conductor L-1 through another normally open switch 97 of said relay and the normally closed switch 95 of the relay CR-3'. As a consequence, after the relay CR-3 of the press holding system shall have been energized by the switch 11 operating through said system, it will remain energized, after the holding system shall have become inactive, until the switch 95 of the relay CR-3' is opened by the switch 11 operating through the system AS-2.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Monitor apparatus for cyclically operable means comprising a rotary monitor switch having an energizing member and a contact support member adapted for unidirectional relative rotation, in synchronism with the operable means to be monitored, said switch embodying a plurality of contact elements, including a number of contact buttons, circularly spaced upon said support member in position successively to make electrical connection with said energizing member as the members are relatively rotated, selector switch and associated relay means forming a command station adapted for connection with the monitor switch, and an operable device controlled by said relay means, said selector switch means being adjustable to select and isolate any desired one of said buttons as signal feed-back means operable, when electrically connected with said energizing member, to deliver an actuating signal, at the command station, for the actuation of the operable device by said relay means, selectively operable digit display apparatus for showing the angular displacement of the energizing member, from a datum position, when engaged with a selected contact button, and actuating means energized in response to engagement of said energizing member with the selected contact button to activate said display apparatus.

2. Monitor apparatus, as set forth in claim 1, wherein the actuating means comprises a leading and a following relay each having an actuating coil, a first circuit for energizing the actuating coil of said leading relay when the energizing member engages the selected contact button, and a second circuit for energizing the coil of said following relay when said energizing member engages the contact button next adjacent said selected contact button, said following relay having a normally closed switch connected in said first circuit to disable the actuating coil of said leading relay as soon as the actuating coil of the following relay becomes energized.

3. Monitor apparatus, as set forth in claim 1, wherein said display apparatus comprises a plurality of digit displaying components, an electrical actuating circuit for each component, a relay for each component having a first relay switch, controllingly connected in the component actuating circuit, a second relay switch and a relay actuating coil, a relay actuating circuit operable to energize the coil in response to engagement of the energizing member with a corresponding engaged contact element, whereby, as each contact element is engaged by the energizing member, the corresponding relay coil will be energized, the second relay switch of each relay being connected in circuit with the next previously energized relay coil.

4. Monitor apparatus, as set forth in claim 1, wherein said contact elements, in addition to said circularly spaced buttons, include a plurality of circularly spaced grouping contacts, on the support member of the rotary switch, in position each subtending an arcuate portion of the switch containing a corresponding group of said buttons, and contact segments in end-to-end abutting relation, on said support member, in position each subtending an arcuate portion of the switch containing a plurality of said grouping contacts, and wherein said digit display apparatus comprises adjacently disposed display devices operable to show numerals in relative position to designate units, tens, and hundreds, separately operable relay means for each of said display devices and respectively actuated in response to engagement of the energizing member with the selected contact button, grouping contact and contact segment, to energize corresponding display devices for operation.

5. Monitor apparatus for cyclically operable means comprising a rotary monitor switch having an energizing member and a contact support member adapted for unidirectional relative rotation, in synchronism with the operable means to be monitored, said switch embodying a plurality of contact elements, including a number of contact buttons, circularly spaced upon said support member in position successively to make electrical connection with said energizing member as the members are relatively rotated, means forming a plurality of command stations, adapted for connection with the monitor switch and each comprising a relay system and an associated selector switching net, an operable device associated with and controlled by each of said relay systems, each switching net being adjustable to select and to connect any of said buttons with its associated command station and thereby constitute the selected button as signal feed-back means operable, when electrically connected with said energizing member, to deliver an actuating signal, at the command station, for the actuation of the operable device by the relay system, and indicating means operable, during rotation of the monitor switch, to momentarily indicate the successive engagement of the energizing member with each of the buttons selected by adjustment of said switching nets.

References Cited

UNITED STATES PATENTS

| | | | |
|---|---|---|---|
| 2,326,930 | 8/1943 | Crowder | 307—141 |
| 2,550,784 | 5/1951 | Coupland et al. | 307—141 |
| 2,659,066 | 11/1953 | Sayer | 340—188 |
| 3,027,506 | 3/1962 | Stenhammar et al. | 307—141 |
| 3,164,819 | 1/1965 | Rantsch et al. | 340—324 X |
| 3,196,213 | 7/1965 | Brothman et al. | 340—324 |
| 3,244,942 | 4/1966 | Deeg | 317—140 |
| 3,278,767 | 10/1966 | Bendicsen | 307—141 |

NEIL C. READ, *Primary Examiner.*

A. J. KASPER, *Assistant Examiner.*